Nov. 18, 1924.
C. E. VAWTER
ELECTRICAL MEASURING INSTRUMENT
Filed Oct. 10, 1919
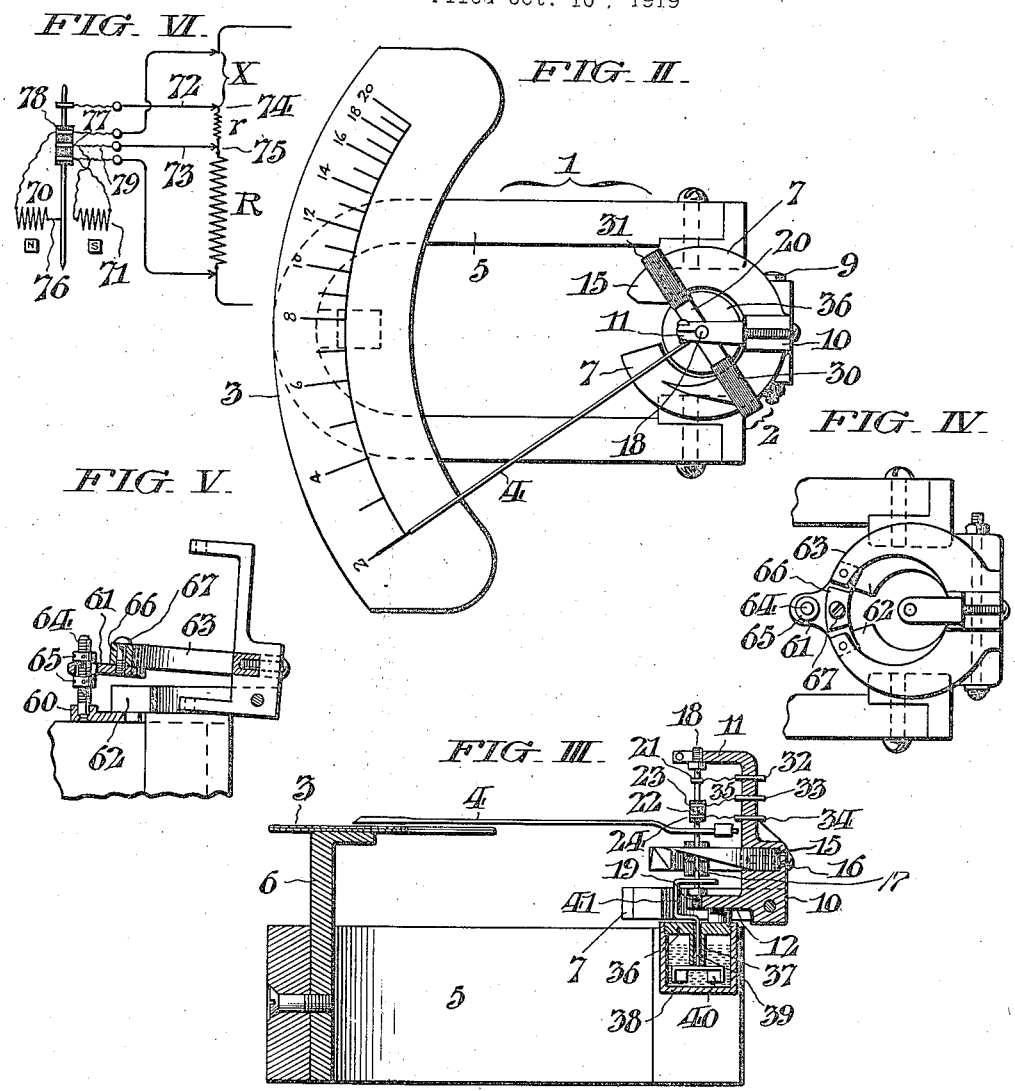
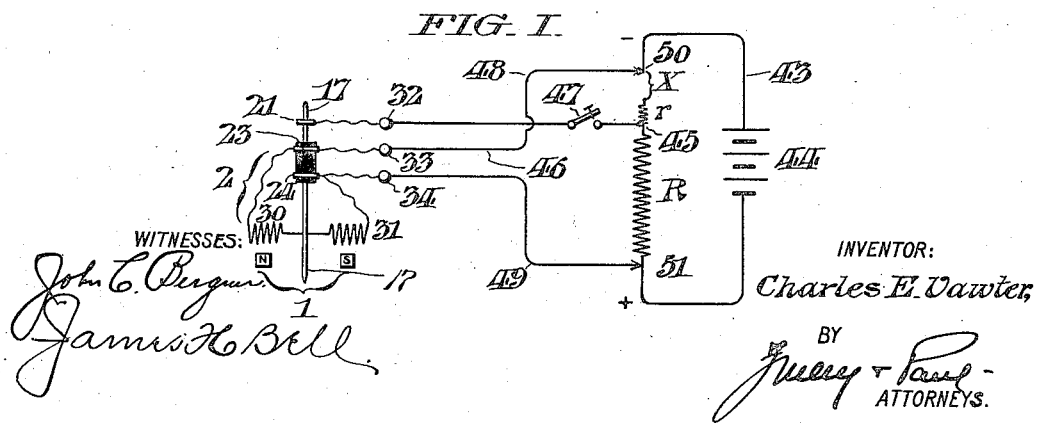
INVENTOR:
Charles E. Vawter,
BY
ATTORNEYS.

Patented Nov. 18, 1924.

1,515,634

UNITED STATES PATENT OFFICE.

CHARLES E. VAWTER, OF PHILADELPHIA, PENNSYLVANIA.

ELECTRICAL MEASURING INSTRUMENT.

Application filed October 10, 1919. Serial No. 329,745.

*To all whom it may concern:*

Be it known that I, CHARLES E. VAWTER, a citizen of the United States, residing in Philadelphia, in the county of Philadelphia and State of Pennsylvania, have invented certain new and useful Improvements in Electrical Measuring Instruments, whereof the following is a specification, reference being had to the accompanying drawings.

My invention relates to electrical measuring instruments, and especially to magnetically controlled instruments of the low resistance differential indicating ohmmeter type. In Patent 1,426,619 I have described a direct reading ohmmeter instrument comprising a pair of coils moveable in a magnetic field, the distribution of which is determined by means of a specially shaped core piece around which the coils are built. The present invention relates to an ohmmeter instrument which is a modification of the instrument in my above mentioned patent and which has for its object to provide a direct reading instrument for indicating low resistance values and at the same time having a total scale range of considerable magnitude, the upper part of the scale being insensitive while the lower portion is sufficiently sensitive to record low resistance values as accurately as may be desired. This instrument is of particular advantage in rail bond testing for the reason that if the bond is in good condition, its resistance will be low and the instrument will indicate its magnitude accurately. On the other hand, if the resistance of the bond is high or if there is an open circuit the insensitivity of the upper portion of the scale range of the instrument will prevent "banging" of the needle. When resistance is high, it is not desired to learn its magnitude because the bond is defective and will under any consideration have to be repaired.

How these and various other advantages can be secured in connection with my invention will appear from the description hereinafter of the best embodiment at present known to me, while its scope and essentials will be indicated in my claims.

In the drawings, Fig. I is a diagram illustrating the principle and use of an instrument embodying my invention.

Fig. II is a plan view of the essential operating parts of an instrument constructed in accordance with my invention and specially adapted to rail-bond testing.

Fig. III is a mid-sectional elevation view of the instrument shown in Fig. II,—two of the parts which extend in front of the plane of section being shown in their entirety, and a coil being shown in a different position.

Fig. IV is a fragmentary plan view corresponding to Fig. I, but showing a modified design and construction.

Fig. V is a fragmentary mid-sectional elevation view corresponding to Fig. IV.

Fig. VI is a diagram corresponding to Fig. I, but illustrating the essential features and use of a slightly modified instrument.

Referring first to Figs. I, II, and III, it will be seen that the operating parts of the instrument comprise relatively movable elements 1 and 2 associated with the scale 3 and the pointer 4 respectively. As shown, the element 1 is stationary, and serves the purpose of magnetic field production, while the element 2 carrying the pointer 4 is movable under its influence in such wise that the position of the pointer on the scale 3 may serve as an indication of the magnitude of the resistance X (or the function of resistance) which it is desired to measure,—or of the ratio of the resistances X and R which it is desired to compare.

The element 1 comprises a permanent magnet 5 of horseshoe shape and of any suitable steel. To this magnet 5 is screwed a bracket 6 to which the scale 3 is attached. To each end or pole of the magnet 5 is attached a horizontal pole-piece 7 of suitable soft iron;—by means of a downwardly-extending angular lug on the pole-piece fitted and screwed against the magnet. The pole-pieces 7, 7 are of curved forms such that they are together nearly equivalent to a flat ring with its axis in the median plane of the magnet 5,—mutilated by the cutting away of portions from its two sides at this plane. The irregularity of the mutilation at the inner gap (speaking with reference to the magnet 5) facilitates the securing of exactly the desired magnetic field.

Between the pole-pieces 7, 7, at their outer gap, is bolted and clamped, by a bolt 9, a bracket-piece 10 (of brass or other non-magnetic metal) having bearing-bracket arms 11 and 12. A soft iron core-piece 15 fits in a transverse notch in the bracket-piece 10 and is secured by a screw 16. The core 15 has the general form of a thin, flat ring of about the same diameter and width as the pole-pieces 7, 7 taken together; but while the ring form is preserved quite regular in the right hand half (looking toward the left in Figs. II and III), the left hand half is considerably modified,—for reasons which will appear hereinafter. This arm of the core 15 is tapered as shown in Figs. 2 and 3. When the indicating pointer is at the lower portion of the scale range, as shown in Fig. 2, both coils surround portions of the core of substantially identical cross section. When however, the pointer is moved to the upper portion of the scale range one of the coils is moved out along the tapered portion of the core and is consequently in a field which is relatively weak and which is decreasing abruptly in strength toward the end of the tapered core arm. Due to the relatively great change of the field from point to point it is evident that a greater change in the resistance being measured is required to produce a given deflection of the indicating pointer along the upper portion of the scale range than is required to produce a similar deflection when the two movable coils are surrounding portions of the core of substantially uniform cross sections, as is the case when the indicating pointer is moving along the lower part of the scale. The core 15 is mounted above the pole-pieces 7, 7 in substantial axial coincidence with them and in approximate parallelism to them, and thus in magnetically inductive proximity to the magnet 5. The magnetic flux from pole to pole of the magnet 5 passes across the air gaps between the poles and the core 15 and through the core itself. For reasons which will be explained hereinafter, the core 15 is only approximately parallel to the pole-pieces 7, 7 being very slightly tilted upward away from them at its opening towards the magnet 5. This tilt is readily controlled and adjusted by rocking the bracket 10 on the pivot afforded by the clamping bolt 9 before the same is finally tightened to clamp the bracket in fixed position with reference to the pole-pieces.

The movable element 2 above referred to has an upright shaft 17 which is mounted to turn with minimum friction in "jewel" bearings 18 and 19 screw threaded in the threaded brackets 11 and 12 (one of said bearings at least being preferably adjustable), coaxially with the core 15. On this shaft 17 are mounted the counterweighted pointer 4; a "bridge piece" 20 (of brass or other non-magnetic metal); and a metal terminal disc 21 and an insulating piece 22 that carries terminal rings 23 and 24. To the end of the bridge piece 20 are secured similar coils 30 and 31 (of suitably fine wire) of such proportions as to surround the core 15 with sufficient clearance to insure perfectly free movement of the element 2. Adjacent ends of these coils are attached and electrically connected to the bridge piece 20 (and so to the shaft 17 and its terminal 21), while the other ends of said coils are attached and electrically connected to the terminal rings 23 and 24. The terminals 21, 23, and 24 are electrically connected, respectively, to suitably insulated terminals 32, 33 and 34 (extending through the upper bearing bracket 11) by means of torsionless spiral trailers 35 of goldleaf or the like. Preferably the pointer 4 extends at right angles to the median plane of the coils, which plane coincides with the axis of the shaft 17.

To the lower bracket 12 is attached a metal cover 36 that has a downward-extending central sleeve 37 and screws into a cylindrical metal casing 38. In the sleeve 37 fits a shaft 39 which carries a paddle 40 in the bottom of the casing and a U-shaped arm 41 that is attached to the shaft 17. The casing 38 is substantially filled with oil, so that the parts constitute a dashpot for giving the instrument an aperiodic or "dead beat" action. The construction of this dashpot with tight cover 36 and sleeve 37 makes it impossible for the oil to spill or leak out.

It will be seen that the parts of the movable system or element 2 can be substantially or even accurately balanced about the shaft 17 so as to eliminate all eccentric inertia effects.

In the wiring-diagram of Fig. I, is shown a circuit 43 comprising resistances measured and identified as X and R connected in series with one another by a lead or resistance measured and identified as $r$; said circuit having a flow of current therein due to a source 44 of difference of potential. X and R may be any resistances which it is desired merely to compare with one another without regard to their absolute magnitude (as a rail-bond and an immediately adjacent standard test length of one of the rail sections connected together by the bond,—in which case $r=0$); or X may be any unknown resistance to be measured in ohms or other standard unit (e. g., the armature or field coil of a large dynamo-electric machine), and R may be a resistance of definite, known, convenient magnitude adapted to serve as a medium of comparison for this purpose. In either case, the terminal 32 common to the instrument coils 30 and 31 is connected to the circuit 43 at a point 45 intermediate X and R,—at their direct junction, if $r=0$, and otherwise at the junction of one or other of them with the intervening resistance $r$,—by a conductor or lead 46, which may conveniently include a reading key 47. The other terminals 33 and 34 belonging to the coils 30 and 31 respectively are connected to the circuit 43 by leads 48 and 49 at opposite ends 50 and 51 of the resistances X and R. So long as the reading key 47 is open, the coil circuits 50—30—45 and 45—31—51 are connected in circuit with the series of resistances $X+r+R$; when the key 47 is closed, one of the coils is in parallel with X or $X+r$, and the other with R or $r+R$. $r+R$, however, is for all practical purposes merely a value of R (since the resistance of any lead $r$ used may be readily measured), so that only the case (that illustrated in Fig. I) where $X+r$ are together in parallel with a coil circuit need be further considered.

By means of the magnet 5, pole-pieces 7, and core 15, there is afforded a magnetic field associated with each of the coils 30 and 31. If the left-hand portion of the magnet 5 in Fig. II be a south pole, the magnetic field of the core 15 will have the character of a north pole at the left of the median plane of the magnet 5, and that of a south pole at the right,—as indicated in Fig. I. Owing to the tilt or inclination of the core 15 with reference to the pole-pieces 7, 7 and to the gap at the inner side of the core, the strength of this field will diminish toward the left in Fig. II in each half of the core. With relative movement of the elements 1 and 2, therefore, the field strengths affecting the coils 30, 31 will vary oppositely; and hence (and this is the important point) the ratio of these field strengths will vary. The coils 30 and 31 should be so wound and connected that their electro-magnetic reactions due to the core field are those of repulsion, so that they tend to produce opposite relative movements of the elements 1 and 2 such as would carry each of the coils in the direction of diminishing field strengths,—i. e. the coils 30 clockwise in Fig. II, and the coil 31 counterclockwise.

Assuming that the instrument is so designed as to simplify to the utmost both its construction and manufacture and the mathematical expression or calculation of its action, the coils 30 and 31 will be made substantial counterparts of one another as respects shape and size, number of turns, and electrical resistance, and will be mounted with their centres at equal radial distances from their axis in the shaft 17; also, the leads 48 and 49 will be such as to make equal the total resistances of the coil circuits 50—30—45 and 45—31—51. The effective electro-magnetic strength characteristics of the coils 30 and 31 will then be alike; and the ratio of the electro-magnetic forces or torques due to currents in the coils will depend only on the intensities of these currents and on the core-field intensities affecting the coils, and will vary directly with these two factors.

The instrument being intended for the measurement of low resistance, it is an easy matter to make the resistances of the coil circuits 50—30—45 and 45—31—51 so high in comparison with $X+r$ and R that the currents in these coil circuits will be of quite insignificant magnitude in comparison with the current in the main line $X+r+R$, so that the currents in $X+r$ and R shall be practically the same. Under these conditions, the "I R drops" or voltages across the coil circuits and the currents in them will be (substantially) in direct proportion to the corresponding resistances $X+r$ and R; and hence the torques due to the coils 30 and 31 will vary directly with these resistances and with the core-field intensities affecting the coils. Hence the position of equilibrium or stable deflection of the pointer 4 on the scale 3 will be a proper measure of the ratio $\frac{X+r}{R}$, and will indicate it directly if the graduations of the scale 3 are made everywhere directly proportional to the ratio of the core-field intensities correspondingly affecting the coils 30 and 31. By proper regulation or proportioning of the intensity of the core-flux or field strength from point to point, the graduation of the scale 3 can be controlled and adjusted exactly as desired. This may be done by proper local variation, from point to point of the core 15, of any one or more of the factors affecting the core-flux and field strength,—such as the air-gap between core and pole-pieces, the width of the core, its cross-section, etc.

The instrument shown in Figs. II, and III, being especially intended for rail-bond testing under conditions where "$r=0$," it is advantageous that its scale 3 be graduated to show the ratio $\frac{X}{R}$ as feet of rail to which the joint resistance X is equivalent, as shown, and that the scale intervals be proportionately greater at the small end of the scale, where a small variation in absolute magnitude is practically of most importance. In Figs. II and III, the core 15 is shown as trimmed so as to give a suitable variation of cross-section and air-gap for this purpose when properly set or tilted.

In cases where X is to be measured in ohms, it may be most convenient for the scale to be uniformly graduated. For this purpose, the core-field intensity should diminish uniformly to the left in Fig. II, and hence the core should have a uniformly diminishing cross-section or be suitably tilted,—or both, as shown in Figs. IV and V. Provision for accurate adjustment of the tilt is here made by means of bracket-pieces 60 and 61 (of brass or other non-magnetic metal) screwed to the inner ends of the pole-pieces 62, 62 and of the halves of the core 63; a screw stud 64 fixed in a lug on the bracket-piece 60, and extending loosely through a hole in the bracket-piece 61; and a pair of spherical-faced nuts 65, 65 on said stud. Provision for variation of relative core-flux and field strength in the two halves of the core 63 is made by means of a supplemental core segment 66 (of the same metal and thickness as the core 63) secured to the upper surface of the bracket piece 60 by means of a screw 67,—the hole in the part 66 for the screw 67 preferably allowing very considerable clearance or play. The segment 66 acts as a connection or shunt for the magnetic flux across the air-gap in the core 63; by setting it in contact with either end of the core or in a suitable intermediate position, practically any desired flux relation between the core halves can be obtained. By these two simple adjustments of core tilt and connection, the same instrument can be adjusted to widely varying requirements, such as the direct reading of either resistance or other quantities of which resistance is a function.

If, with uniformly varying core-flux ratio, $r=0$, the deflections of the pointer 4 will be directly proportional to $X$, and the scale may obviously be graduated to read the value of $X$ directly. In cases where $r$ is not zero, $X$ may still be read directly if the left-hand end of the scale be at the $X=0$ position of the pointer 4,—i. e., corresponds to the ratio $\frac{r}{R}$. If the scale be graduated to read $X+r$ directly, then $r$ must be measured separately and subtracted from the scale reading to obtain the value of $X$.

All complications from the lead $r$ or its omission can readily be avoided by a slight modification of the wiring such as indicated in Fig. VI. This modification consists merely in providing the coils 70 and 71 with separate leads 72 and 73 (in lieu of the common lead 46 of Fig. I) and connecting these leads 72 and 73 at opposite ends of $r$, at its points of junction 74 and 75 with $X$ and $R$. For this purpose, the coil 71 is insulated from the bridge-piece 76 and electrically connected to an additional terminal ring 77 on the insulating part 78 which ring, in turn, has its own separate trailer 79. With this mode of connection, $r$ has no effect on the relative currents in the two coil circuits, and their ratio is always simply $\frac{X}{R}$.

If intended for mere comparison of resistances $X$ (or $X+r$) and $R$, the instrument itself (either Fig. I, or Fig. VI type) will simply have terminals for their connection; if intended especially for absolute measurement of an unknown resistance $X$ (or $X+r$) the instrument as constructed may have terminals only for its connection thereto, and may include the resistance $R$ (either fixed or variable by steps of known magnitude) as an accessory in its own organization. In some cases, the instrument may, likewise, include the source of potential and current 44; in others, the source 44 may be an extrinsic one connected in circuit. In cases where (as in rail-bond testing) there is normally a suitable flow of current through the resistances $X$ and $R$ in series, no other current will be necessary.

While it has been assumed above that the effective electro-magnetic strength or torque characteristics of the coils 30, 31 (or 70, 71) were made alike, it will be evident that coils of any fixed relative electro-magnetic strength characteristics will always assume the same positions in a given core field for currents of the same ratio, so that similarity of electro-magnetic strength characteristics is not essential to an instrument embodying my invention in its broader aspects. Even for uniform scale graduation, moreover, the magnetic field strength affecting one of the coils need not necessarily vary at all,—if that affecting the other be properly adjusted from point to point,—since variation in the ratio of the field strengths suffices for proper magnetic control of the instrument.

Having thus described my invention, I claim:

1. An instrument of the class described comprising a magnet for producing a magnetic field, a movable element comprising a pair of coils rotatable in said field and an indicating pointer associated therewith, said coils being adapted for connection respectively in a circuit with a fixed resistance and with the resistance to be measured, a specially shaped core of magnetic material positioned within said field for determining the distribution of magnetic flux along the paths traversed by said coils, the portion of the core adjacent one of said coils being tapered off sharply and falling short of the limit of movement of the coil to thereby effect an abrupt reduction of the magnetic flux at that portion of the path of movement of the coil.

2. An instrument of the class described comprising a magnet for producing a magnetic field, a movable element comprising a pair of coils rotatable in said field and an indicating pointer associated therewith, said coils being adapted for connection respectively in circuit with a fixed resistance and with the resistance to be measured, a core of magnetic material in said field for determining the distribution of the magnetic flux and having a sharply tapered portion to abruptly reduce the magnetic flux along the direction of the path of movement of one of said coils as the pointer swings towards the upper part of the scale range, whereby the lower portion of the scale range of said indicating pointer is sensitive to thereby accurately indicate the magnitudes of low resistance values while the upper portion of the scale range is insensitive thereby permitting a large total scale range.

3. An instrument of the class described comprising a magnet for producing a magnetic field, a movable element comprising a pair of coils rotatable in said field and an indicating pointer associated therewith, said coils being adapted for connection respectively in circuit with a fixed resistance and the resistance to be measured, a core of magnetic material in said field for determining the distribution of the magnetic flux having an abruptly tapered portion to reduce the magnetic flux along the path of one of said coils as the indicating pointer swings toward the upper part of the scale, and a portion of substantially uniform cross section along the path of movement of the other coil, whereby the lower portion of the scale range of said indicating pointer is sensitive to thereby accurately indicate the magnitudes of low resistance values while the upper portion of the scale range is insensitive, thereby permitting a large total scale range, and means for tilting said core to vary its proximity to said magnet, whereby the density of the magnetic flux along the path of movement of said coils may be varied.

In testimony whereof, I have hereunto signed my name at Philadelphia, Pennsylvania, this seventh day of October, 1919.

CHARLES E. VAWTER.

Witnesses:
  JAMES H. BELL,
  E. L. FULLERTON.